United States Patent [19]
Badia

[11] Patent Number: 5,657,883
[45] Date of Patent: Aug. 19, 1997

[54] MOBILE FISHING ROD RACK

[76] Inventor: Mario Badia, 4570 NW. 49th Ct., Coconut Creek, Fla. 33073

[21] Appl. No.: 575,603

[22] Filed: Dec. 20, 1995

[51] Int. Cl.$^6$ ..................................................... A47F 7/00
[52] U.S. Cl. ........................... 211/70.8; 211/60.1; D6/552
[58] Field of Search ............................ 211/70.8, 70.6, 211/70.2, 65, 64, 60.1; 224/922; D22/147; D6/552

[56] References Cited

U.S. PATENT DOCUMENTS

| | | | |
|---|---|---|---|
| D. 142,513 | 10/1945 | Cross | 211/70.2 X |
| D. 162,207 | 2/1951 | Mettenletter | 211/64 X |
| D. 164,503 | 9/1951 | Kerr | 211/70.2 X |
| 331,011 | 11/1885 | Thompson | 211/70.6 |
| 838,473 | 12/1906 | Speiser | 211/65 |
| 1,733,868 | 10/1929 | Durell | 211/70.6 |
| 2,590,154 | 3/1952 | Burns | 211/70.2 X |
| 2,854,147 | 9/1958 | Derr | 211/70.8 |
| 2,958,422 | 11/1960 | Caloiero et al. | 211/64 X |
| 3,004,673 | 10/1961 | Emery | 211/70.8 |
| 3,953,033 | 4/1976 | Kelly et al. | 211/70.2 X |
| 4,311,262 | 1/1982 | Morin | 224/922 X |
| 5,005,847 | 4/1991 | King et al. | 224/922 X |
| 5,054,625 | 10/1991 | Foley | 211/60.1 X |
| 5,137,319 | 8/1992 | Sauder | 211/70.8 X |
| 5,294,163 | 3/1994 | Lang | 211/70.8 X |

Primary Examiner—Leslie A. Braun
Assistant Examiner—Sandra Snapp
Attorney, Agent, or Firm—Oltman, Flynn & Kubler

[57] ABSTRACT

A mobile fishing rod rack includes top and bottom boards and side boards with holes for receiving fishing poles. The rack is mounted on caster wheels such that it is mobile and can be rolled around for easy access and storage and convenience in loading fishing poles.

5 Claims, 1 Drawing Sheet

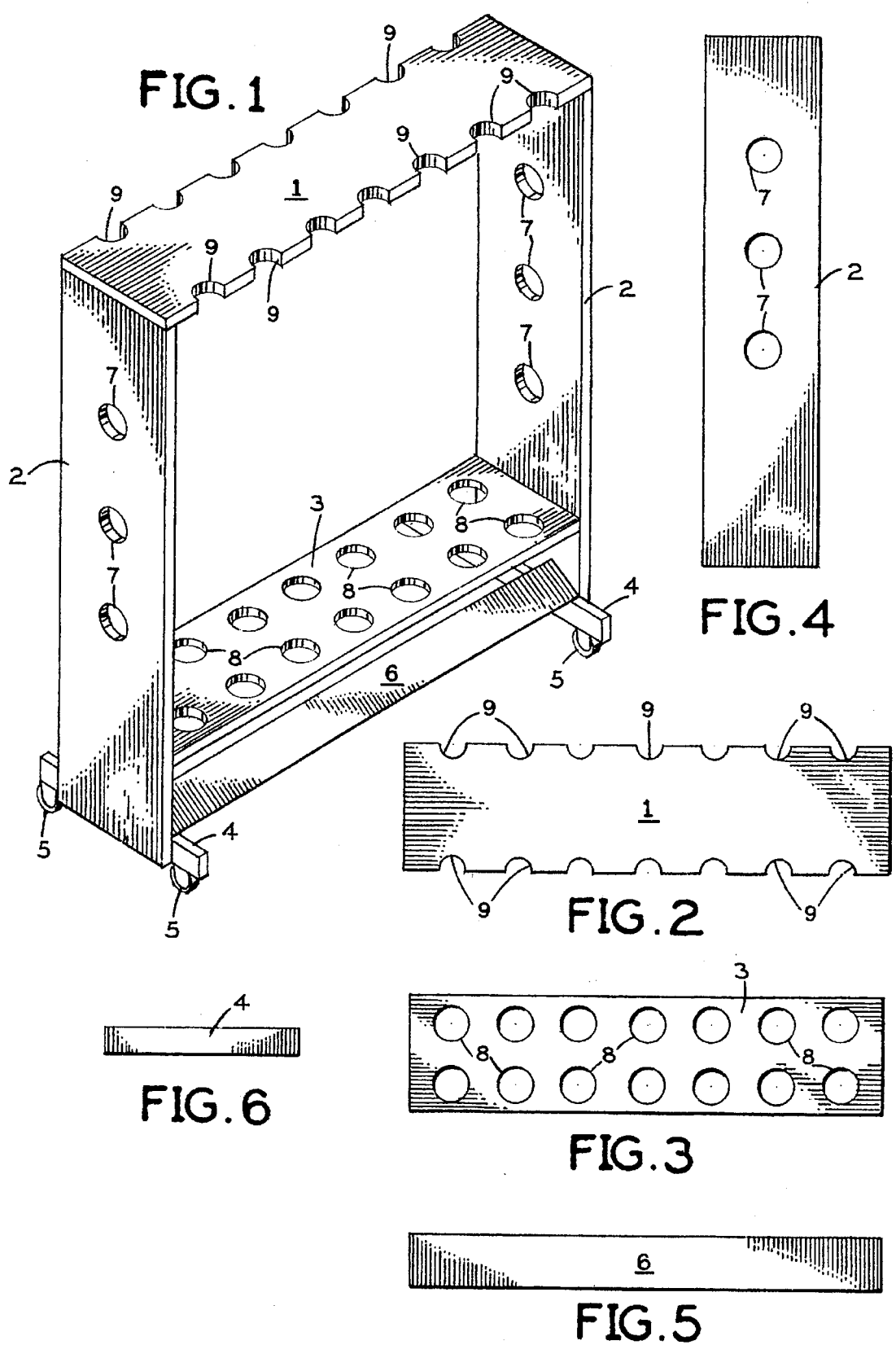

MOBILE FISHING ROD RACK

BACKGROUND OF THE INVENTION

There are no compact mobile rod racks on the market for the public to purchase for private use. Available are only garage wall mounted immobile rod holders.

SUMMARY OF THE INVENTION

This mobile compact rod rack may be used for salt or fresh water poles. It prevents pile-up of fishing poles and damage to tips and eyes. Hooks are kept secure. Poles do not warp due to leaning on walls. Homeowners, apartment and mobile home dwellers may wheel this mobile rod rack from home to boat or car to unload poles rather than carry them.

This mobile rod rack is unique for its storage and mobile use; space saving and mobility all in one. Having easy access to rods is convenient for every fisherman.

Further advantages of this invention will be apparent from the following detailed description of a presently preferred embodiment which is illustrated schematically in the accompanying drawings.

BRIEF DESCRIPTION OF THE DRAWINGS

FIG. 1 is a perspective view of a mobile rod rack in accordance with one embodiment of the invention;

FIG. 2 is a top plan view of a top board of the mobile rod rack shown in FIG. 1;

FIG. 3 is a plan view of a bottom board included in the rod rack of FIG. 1;

FIG. 4 is a plan view of a side board included in the rod rack of FIG. 1;

FIG. 5 is a plan view of a bottom angle board of the rod rack of FIG. 1; and

FIG. 6 is a plan view of wheel board of the rod rack of FIG. 1.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENT

The mobile rod rack is shown in FIG. 1, and it includes a horizontal top board 1, and a horizontal bottom board 3 spaced apart from each other a distance of approximately 25 inches and extending parallel to each other. The top board and bottom board are supported by two vertical side boards 2, which are spaced from each other a distance of approximately 28¾ inches and which extend parallel to each other. The bottom ends of the side boards are attached to and supported by two wheel boards 4, and four caster type wheels 5 are mounted on the wheel boards and engage the ground so that the rod rack can be moved around.

The top board 1 has a plurality of pole rest notches 9 on each side edge, and these notches may be separated from each other by about 2½ inches. The notches are open at the side edge so that a fishing pole or rod may be leaned into each notch and will rest there. The bottom board 3 has a plurality of bottom pole holes 8 spaced inwardly slightly from each side edge and separated laterally from each other by about 1½ inches. The holes in the bottom board 3 and the notches in the top board 1 are respectively aligned with each other. The ends of the top board 1 and the bottom board 3 are attached to the side boards 2.

Beneath the bottom board there are two angle boards 6, one of which is visible in FIG. 1. The ends of each of these angle boards are attached to the side boards 2, and the angle boards are tilted at an angle of approximately 26° C. for receiving the bottom ends of the fishing poles or rods and urging them outwardly.

The side boards 2 each have three side holes 7 spaced vertically such that the holes in the respective side boards are in alignment with each other. These side pole holes may receive relatively large fishing poles. Also, fishing poles may be inserted in each of the pole rest notches 9 and bottom pole holes 8 such that the poles will rest on the bottom angle boards 6 and be retained by the bottom pole holes and pole rest notches.

Although representative dimensions are set forth herein, these dimensions are meant to be illustrative only and not limiting.

I claim:

1. A mobile fishing rod rack comprising:

a pair of vertical side boards spaced apart and parallel with each other;

a top board having side edges with pole rest notches therein and mounted horizontally on said side boards;

a bottom board having bottom pole holes therein and mounted on said side boards under said top board and parallel therewith;

a pair of angle boards mounted under said bottom board on said side boards at an angle to said top and bottom boards that is downward and outward relative to the side boards such that fishing rods may be received in said notches and pole holes and rest on said angle boards at the bottom thereof wherein said angle boards urge the fishing rods outwardly creating a shear between said bottom board and the fishing rod thereby holding the fishing rods in place; and caster wheels mounted on said side boards for allowing movement of said fishing rod rack.

2. A mobile fishing rod rack according to claim 1 in which said caster wheels are mounted on wheel boards attached to the bottom ends of said side boards.

3. A mobile fishing rod rack of claim 1 in which said side boards have a plurality of side pole holes therein for receiving additional fishing rods.

4. A mobile fishing rod rack of claim 1 in which said pole rest notches and bottom pole holes are in alignment with each other.

5. A mobile fishing rod rack of claim 4 in which said side pole holes in said two side boards are in alignment with each other.

\* \* \* \* \*